US011920354B2

(12) United States Patent
Martin et al.

(10) Patent No.: US 11,920,354 B2
(45) Date of Patent: Mar. 5, 2024

(54) MODULAR GUARDRAIL SYSTEM

(71) Applicant: Rex Industrial, LLC, Baton Rouge, LA (US)

(72) Inventors: Robert Allan Martin, Baton Rouge, LA (US); Lucas Banquer, Baton Rouge, LA (US)

(73) Assignee: Rex Industrial, LLC, Baton Rouge, LA (US)

(*) Notice: Subject to any disclaimer, the term of this patent is extended or adjusted under 35 U.S.C. 154(b) by 181 days.

(21) Appl. No.: 17/530,423

(22) Filed: Nov. 18, 2021

(65) Prior Publication Data

US 2022/0154471 A1 May 19, 2022

Related U.S. Application Data

(60) Provisional application No. 63/115,337, filed on Nov. 18, 2020.

(51) Int. Cl.
*E04F 11/18* (2006.01)
*E06B 11/02* (2006.01)

(52) U.S. Cl.
CPC ...... *E04F 11/1812* (2013.01); *E04F 11/1836* (2013.01); *E06B 11/022* (2013.01); *E04F 2011/187* (2013.01)

(58) Field of Classification Search
CPC . E04G 21/32; E04G 21/3204; E04G 21/3223; E04G 21/3233; E04G 21/3242;
(Continued)

(56) References Cited

U.S. PATENT DOCUMENTS 5,683,074 A 11/1997 Purvis
6,279,880 B1 * 8/2001 Hawks, Jr. .......... E04F 11/1834 403/109.1

(Continued)

FOREIGN PATENT DOCUMENTS

CN 204181292 U 3/2015
DE 3210497 A1 * 10/1983

(Continued)

OTHER PUBLICATIONS

Guard Rail Kit—Telescopic Version to EN81-20, Retrieved from Internet, Retrieved on Oct. 29, 2021 <URL: https://www.elevatorequipment.co.uk/en8120-product-range/guard-rail-kit-telescopic-version-to-en8120>.

*Primary Examiner* — Jonathan P Masinick

(57) ABSTRACT

A modular guardrail system relates to a set of interconnected beams that each fit into pairs of detachable bases, thus allowing for the creation, adjustment, and removal of a variety of configurations of temporary fence-style barriers. Each guardrail section may include two vertical posts, one on each end of each guardrail section, connected by a set of horizontal beams and, in some cases, a horizontal toeplate. Adjacent guardrail sections share a common base, thus allowing for the chain assembly of an extended barrier. The base that connects to the guardrail sections may include several vertically-oriented brackets that may slide into the different guardrail posts. The placement of the vertical brackets upon the base is selected so that each of the attached guardrail sections can be arranged independently of one another in any direction. The vertical brackets may be rotatably attached, thereby allowing for more flexible arrangements of the guardrail sections.

17 Claims, 6 Drawing Sheets

(58) Field of Classification Search
CPC .. E04G 5/14; E04G 5/142; E04F 11/18; E04F 11/1812; E04F 11/1842; E04F 11/1846; E04F 2011/187; E06B 11/02; E06B 11/022; E06B 11/027; E04H 17/185; E04H 17/22; E04H 17/009; E04H 17/013
See application file for complete search history.

(56) References Cited

U.S. PATENT DOCUMENTS

| | | | | |
|---|---|---|---|---|
| 6,554,257 | B1 * | 4/2003 | Kenton | E04H 17/18 256/65.14 |
| 6,786,017 | B2 * | 9/2004 | Thompson | E04B 2/7433 52/298 |
| 7,063,186 | B1 * | 6/2006 | Granke | E04G 21/3223 182/113 |
| 8,424,851 | B2 * | 4/2013 | Christoffer | E01F 13/022 256/65.14 |
| 9,032,666 | B2 * | 5/2015 | Honeycutt | E05F 1/1207 49/55 |
| 9,926,738 | B1 * | 3/2018 | Brown | E06B 9/04 |
| 10,450,740 | B2 * | 10/2019 | Magargee | E02D 27/42 |
| 10,597,057 | B1 * | 3/2020 | Hilmerson | E04G 5/001 |
| 2007/0252125 | A1 * | 11/2007 | Thompson | E04H 17/163 256/24 |
| 2007/0267552 | A1 * | 11/2007 | Meyer | E04H 12/2276 248/156 |
| 2010/0171085 | A1 * | 7/2010 | Webster, IV | E04G 21/3223 256/65.14 |
| 2010/0264390 | A1 * | 10/2010 | Cerda | E04G 5/142 29/428 |
| 2014/0367628 | A1 * | 12/2014 | Hewson | E04G 5/142 256/65.14 |
| 2018/0320405 | A1 * | 11/2018 | Matthews | E04H 12/2276 |
| 2021/0271787 | A1 * | 9/2021 | Fugallo, III | E04G 21/3276 |

FOREIGN PATENT DOCUMENTS

| | | | | |
|---|---|---|---|---|
| DE | 9301470 | U1 * | 5/1993 | |
| DE | 29615755 | U1 * | 12/1996 | E04B 1/0038 |
| DE | 102009044483 | A1 * | 5/2011 | E04F 11/1851 |
| EP | 0571282 | A1 * | 11/1993 | |
| GB | 2512316 | A * | 10/2014 | E04H 12/2215 |
| JP | H0680269 | B2 * | 10/1994 | |
| JP | 2992881 | B2 * | 12/1999 | E04G 5/142 |
| KR | 20090058288 | A * | 6/2009 | |
| KR | 20090063418 | A * | 6/2009 | |
| KR | 200446363 | Y1 * | 10/2009 | |
| KR | 20100088145 | A * | 8/2010 | |
| KR | 20110080196 | A * | 7/2011 | |
| KR | 20110009067 | U * | 9/2011 | |
| KR | 20100011491 | U * | 10/2011 | |
| KR | 20110131336 | A * | 12/2011 | |
| KR | 101228838 | B1 * | 2/2013 | |
| WO | WO-8605834 | A1 * | 10/1986 | |

* cited by examiner

MODULAR GUARDRAIL SYSTEM

The current application claims a priority to the U.S. Provisional Patent application Ser. No. 63/115,337 filed on Nov. 18, 2020.

FIELD OF THE INVENTION

The present invention relates generally to an adjustable safety railing. More specifically, the modular guardrail system is a set of interconnected beams that each fit into pairs of detachable bases, thus allowing for the creation, adjustment, and removal of a variety of configurations of temporary fence-style barriers.

BACKGROUND OF THE INVENTION

In offshore, industrial, and construction environments, every year multiple people fall through open floor holes and over ledges, often resulting in injuries or even death. According to the Occupational Safety and Health Administration (OSHA), falls are the leading cause of death in the construction industry, as they were responsible for 338 out of 1,008 total work-related deaths in 2018.

To prevent such injuries from occurring, a variety of suboptimal guardrail systems have been developed. Many of the guardrail systems used to restrict access to fall hazard areas generally comprise of a base component and a guardrail component. Currently available modular guardrail systems for temporary applications utilize large and/or heavy bases in lieu of anchoring. These bases commonly weigh 70 to 90 lbs, or require placement of heavy items, such as sandbags, on top of the bases, so that the required load resistance can be achieved. The bases are not able to anchor easily to multiple types of floor surfaces such as grating, metal plate, concrete, earth, etc. Such systems are particularly unsuitable for use on floor surfaces such as grating or metal plate, which are lower friction surfaces and therefore require anchoring even in temporary applications. Furthermore, the size and weight of these bases are not practical for use in industrial and offshore environments, in which size and weight present challenges for transportation and storage.

In addition, currently available temporary guardrail systems are generally unable to accommodate an integral toeplate for falling object protection. Toeplates are helpful in preventing slippage or foot entrapments beneath the guardrail portions of these guardrail systems. The toeplates often used on currently available systems are separate components, which can be problematic for storage and installation. The guardrail sections are also typically of fixed length, which limits the size/shape of possible configurations. Expanding guardrail and toeplate sections are currently available, but these systems generally fail to fully address the challenges that the present invention addresses.

The present invention seeks to provide a solution to the problem of workplace injuries or deaths due to falls by providing a modular guardrail system with both a base and guardrail sections of minimal size and weight, that can be fabricated of commonly used material durable in the harshest environments, and that can be anchored easily and intuitively, with a single or multiple anchor points, to multiple types of ground surfaces (including, but not limited to, grating, metal plate, concrete, earth, etc.). The anchor hole may be slotted in two directions to provide the maximum positional flexibility which is required for anchoring to grating. The anchoring mechanism enables the modular guardrail system to accommodate load requirements, including, but not limited to, those set by OSHA, in both the vertical and horizontal directions, without relying on base to ground surface friction, which is limited on many types of floor surfaces.

The present invention is optimized for temporary applications but may be appropriate for long-term applications as well. Long-term applications could utilize a preassembled out-of-the-box guardrail kit that can accommodate various guardrail shapes and configurations while requiring minimal customization and assembly labor. Long-term use of this product is possible with periodic inspection. Such applications are also within the scope of the present invention.

DETAILED DESCRIPTION OF THE INVENTION

All illustrations of the drawings are for the purpose of describing selected versions of the present invention and are not intended to limit the scope of the present invention.

Figure 1:
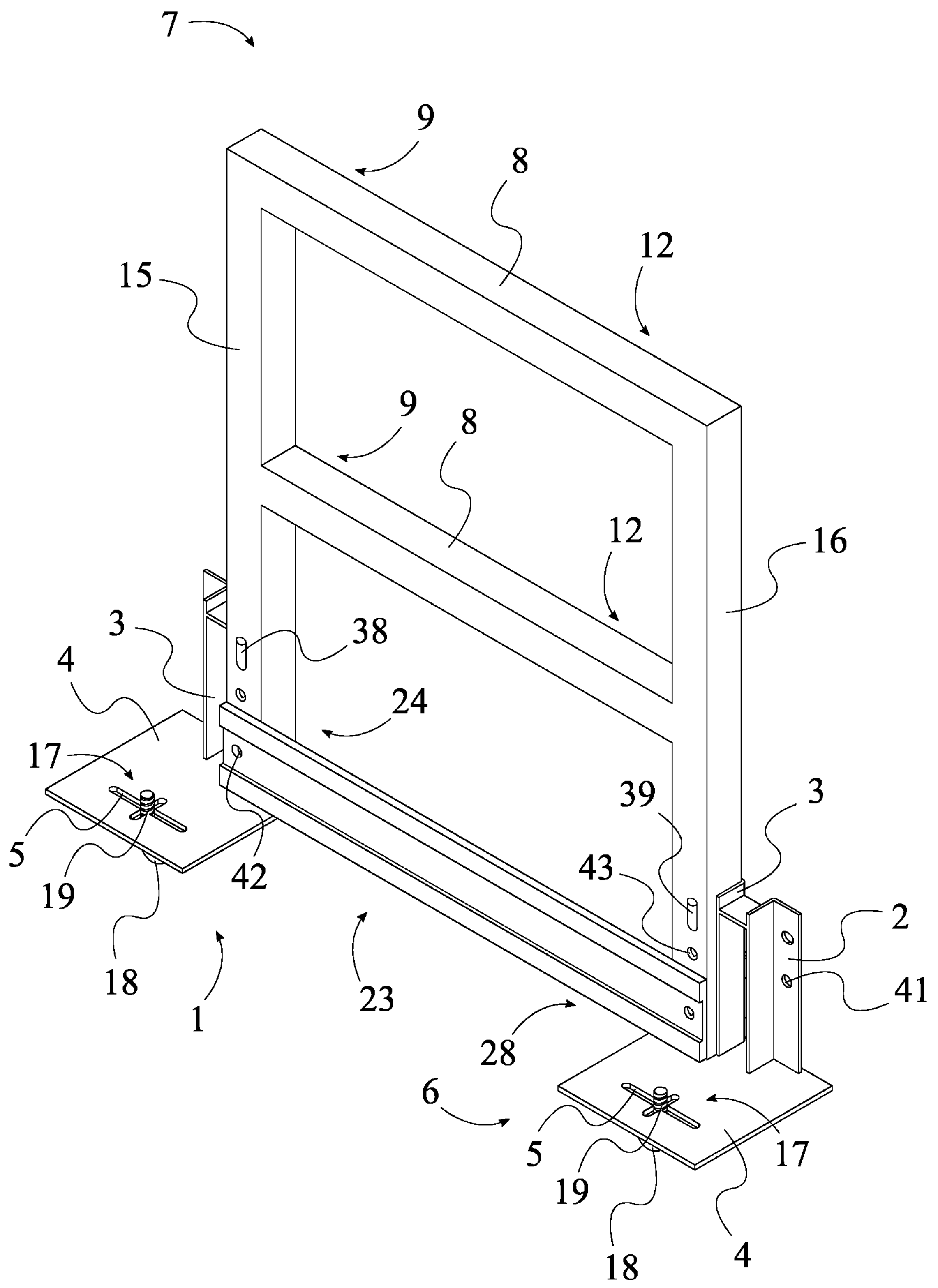
FIG. 1 is a front perspective view of the present invention.

The present invention is a modular guardrail system that is used to create a customizable temporary barrier, preventing potential injuries that may occur due to careless movement in unsafe locations. The present invention is also configured to be easy to assemble, anchor in place, disassemble, and move, thereby addressing many common problems associated with current temporary barrier solutions. The present invention comprises at least one first structural base 1, at least one second structural base 6, and at least one guardrail assembly 7, as shown in FIG. 1. The at least one first structural base 1 is a rigid unit upon which the at least one guardrail assembly 7 can mount. Similarly, the at least one second structural base 6 is a rigid unit upon which the at least one guardrail assembly 7 can mount. The at least one guardrail assembly 7 is the set of interconnected rigid beams that, in the preferred usage of the present invention, prevent people and items from accidentally passing into a restricted or unsafe area. The at least one guardrail assembly 7 mounts to the at least one first structural base 1 on one end and the at least one second structural base 6 on the opposing end, thereby allowing an assembler to chain multiple sets of guardrails and structural bases to form a continuous, elongated barrier.

The general configuration of the aforementioned components allows the present invention to efficiently and effectively form a temporary, adjustable barrier on a variety of surfaces. The at least one first structural base 1 and the at least one second structural base 6 may comprise a first vertical bracket 2, a second vertical bracket 3, a base plate 4, and an anchoring opening 5, as shown in FIG. 1. The first vertical bracket 2 is a post, beam, or other such rigid extended unit to which the at least one guardrail assembly 7 may secure. Similarly, the second vertical bracket 3 is a post, beam, or other such rigid extended unit to which the at least one guardrail assembly 7 may secure. The base plate 4 is a rigid panel that allows for positioning of the first vertical bracket 2 and the second vertical bracket 3 while simultaneously providing an intuitive surface for the application of sandbags or other sources of additional external stabilizing weight during use. The anchoring opening 5 is a space through which ties, bolts, ropes, or a variety of other fasteners may fit in order to secure the present invention to any of a variety of surfaces, including grating, metal plate, concrete, earth, and more. The at least one guardrail assembly 7 may comprise at least one horizontal rail 8, a first vertical rail 15, and a second vertical rail 16. The at least one horizontal rail 8 relates to a set of beams or extended rigid segments that prevent persons or items from passing through the at least one guardrail assembly 7. The first vertical rail 15 is a rigid post that enables arrangement of the at least one horizontal rail 8 relative to the first vertical bracket 2. Similarly, the second vertical rail 16 is a rigid post that enables arrangement of the at least one horizontal rail 8 relative to the second vertical bracket 3. The at least one horizontal rail 8 may comprise a first horizontal rail segment 9 and a second horizontal rail segment 12. The first horizontal rail segment 9 is the portion of the at least one horizontal rail 8 that preferably joins to the first vertical post. The second horizontal rail segment 12 is the portion of the at least one horizontal rail 8 that preferably joins to the second vertical post.

The above components combine to form the desirable adjustable temporary barrier. The first vertical bracket 2 and the second vertical bracket 3 may be terminally attached perpendicular to the base plate 4, as shown in FIG. 1. This arrangement positions the first vertical bracket 2 and the second vertical bracket 3 normal to the base plate 4, thus providing an intuitive mounting mechanism for the first vertical rail 15 and the second vertical rail 16, respectively. The anchoring opening 5 may traverse through the base plate 4, adjacent to the first vertical bracket 2 and the second vertical bracket 3. In this way, the anchoring opening 5 may be utilized as an anchor point, allowing any of a variety of external tools, including ties, bolts, ropes, or a variety of other fasteners to secure the present invention to a variety of surfaces, including grating, metal plate, concrete, earth, and more. The first vertical rail 15 may be fastened to the first vertical bracket 2 of the at least one first structural base 1. This arrangement results in restriction of the translational motion of the first vertical rail 15, preventing the first vertical rail 15 from moving forwards, backwards, or to either side without also moving the first vertical bracket 2. A variety of fasteners and fastening devices may be utilized to fasten the first vertical rail 15 to the first vertical bracket 2 of the at least one first structural base 1, including screws, bolts, nails, washers, nuts, and a variety of other common connective units. Similarly, the second vertical rail 16 may be fastened to the second vertical bracket 3 of the at least one second structural base 6. This arrangement results in restriction of the translational motion of the second vertical rail 16, preventing the second vertical rail 16 from moving forwards, backwards, or to either side without also moving the second vertical bracket 3. A variety of fasteners and fastening devices may be utilized to fasten the second vertical rail 16 to the second vertical bracket 3 of the at least one second structural base 6, including screws, bolts, nails, washers, nuts, and a variety of other common connective units. The connection of the first vertical rail 15 to the first vertical bracket 2 and the second vertical rail 16 to the second vertical bracket 3 ensures that the at least one guardrail assembly 7 is sufficiently restricted in movement to reduce the potential for accidental passage of persons or items. The first vertical rail 15 may be positioned offset from the second vertical rail 16. Thus, ample space may be provided for the at least one horizontal rail 8. The at least one horizontal rail 8 may be perpendicularly connected between the first vertical rail 15 and the second vertical rail 16. This arrangement prevents any potential motion of the at least one horizontal rail 8 relative to the first vertical rail 15 and the second vertical rail 16, and thus also to the first vertical bracket 2 and the second vertical bracket 3. The first horizontal rail segment 9 may be terminally connected to the first vertical rail 15. In this way, the first horizontal rail segment 9 is secured in position relative to the first vertical rail 15. Similarly, the second horizontal rail segment 12 may be terminally connected to the second vertical rail 16. Thus, the second horizontal rail segment 12 is secured in position relative to the second vertical rail 16.

Figure 2:
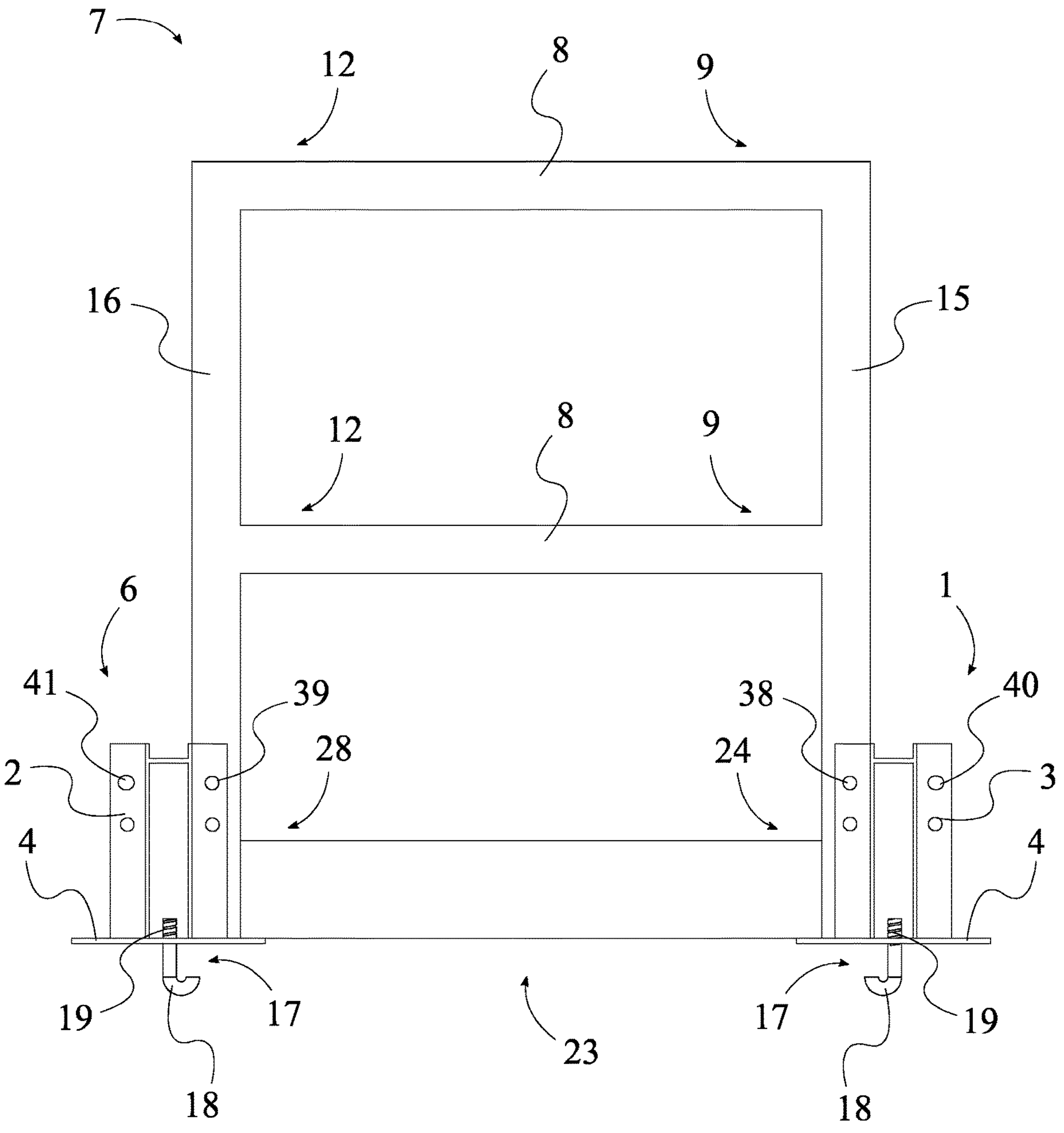
FIG. 2 is a rear view of the present invention.

In many environments, it may be advantageous to utilize an elongated spike, stake, or other such rigid device to secure the base plate 4 to the ground or other surfaces. To provide for this, the present invention may further comprise an anchoring fastener 17, as shown in FIG. 2. The anchoring fastener 17 may be any of stakes, spikes, ropes, chains, or a variety of other such connecters capable of securing the base plate 4 within a given environment. The anchoring fastener 17 may comprise an anchoring stopper 18 and an anchoring pin 19. The anchoring stopper 18 is a section of the anchoring fastener 17 which may be grasped or otherwise conveniently interacted with for intuitive usage of the anchoring fastener 17 while simultaneously preventing the anchoring fastener 17 from passing too far through the anchoring opening 5. The anchoring pin 19 is any of a variety of elongated rigid units, such as bolts, screws, nails, or other such units capable of securing through the anchoring fastener 17 into the earth or other given surfaces. In an exemplary embodiment, the anchoring fastener 17 is a J-bolt, with the anchoring stopper 18 corresponding to the handle portion and the elongated segment corresponding to the anchoring pin 19. The anchoring stopper 18 may be terminally connected to the anchoring pin 19. This arrangement allows movement of the anchoring stopper 18 to affect the anchoring pin 19. The anchoring fastener 17 may be positioned against the baseplate. In this way, the anchoring fastener 17 secures the anchoring pin 19 in an appropriate position relative to the base plate 4. The anchoring pin 19 may traverse through the anchoring opening 5. Thus, the anchoring pin 19 secures the base plate 4 to the ground or other given surface during use. In an exemplary embodiment, the base plate 4 may further comprise a pin holster. The pin holster is a generally hollow unit connected to the base plate 4, adjacent to the anchoring opening 5 that allows for storage of the anchoring fastener 17 between uses. The anchoring pin 19 may slide into the pin holster for convenient storage.

A user of the present invention may need to form a barrier atop grating, which requires the anchoring fastener 17 to shift during use. To this end, the anchoring opening 5 may be a t-shaped hole, as shown in FIG. 1. This configuration allows for the anchoring fastener 17, especially the exemplary embodiment in which the anchoring fastener 17 is a J-hook, to hook onto a grate bar and secure, via nuts or other such removable fasteners, appropriately to the base plate 4 during use.

Figure 4:
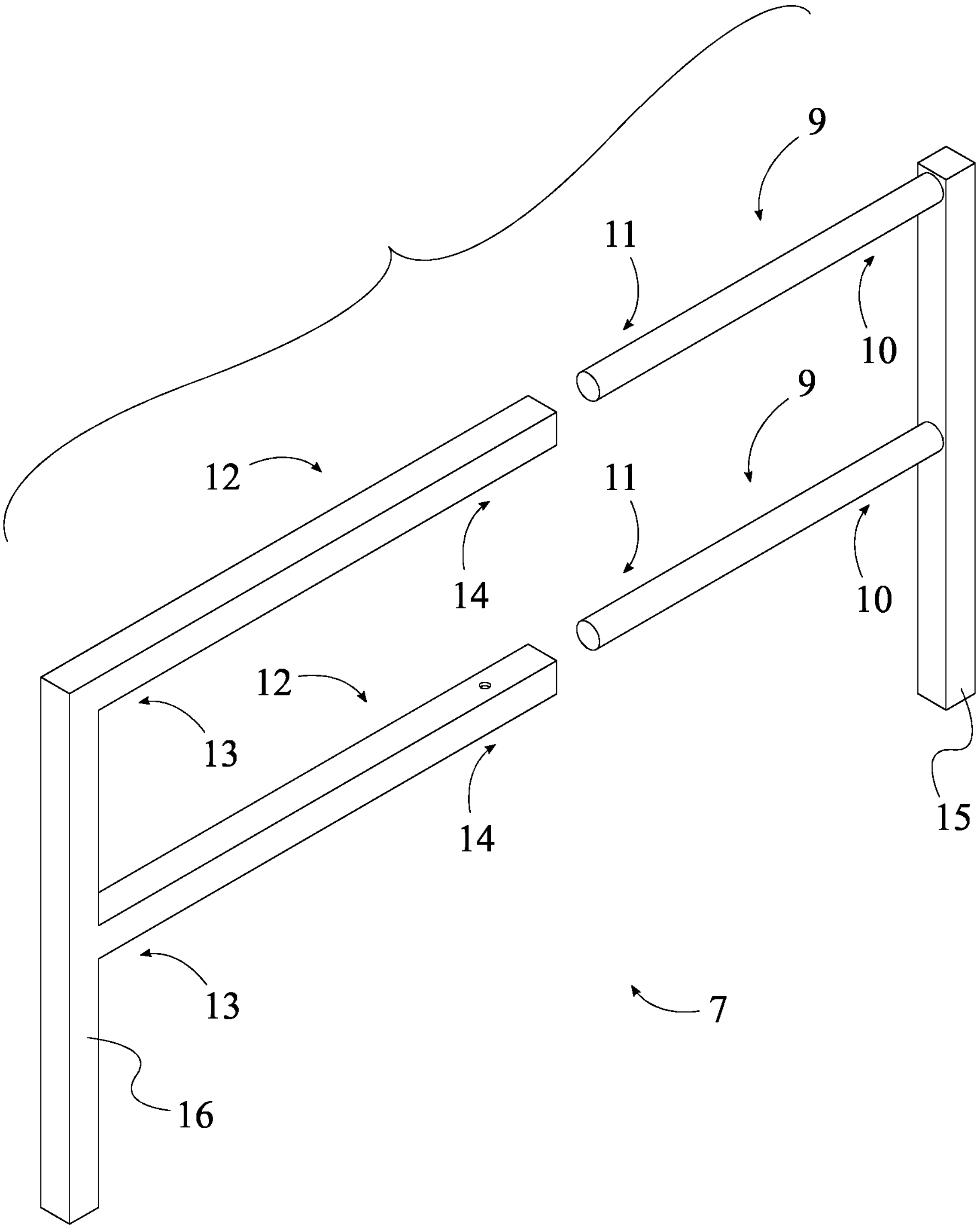
FIG. 4 is an exploded perspective view of adjustable length members.

It may be advantageous to allow for the at least one horizontal rail 8 to expand or contract to adjust the at least one guardrail assembly 7 to an appropriate size. To this end, the present invention may further comprise a horizontal length adjustment mechanism 20, as shown in FIG. 4. The horizontal length adjustment mechanism 20 is a mechanism capable of increasing, decreasing, and fixing the distance between the first horizontal rail segment 9 and the second horizontal rail segment 12. The first horizontal rail segment 9 may comprise a first proximal segment end 10 and a first distal segment end 11. The first proximal segment end 10 is the portion of the first horizontal rail segment 9 that is generally proximal to the first vertical rail 15. The first distal segment end 11 is the portion of the first horizontal rail segment 9 that is generally distal from the first vertical rail 15. Similarly, the second horizontal rail segment 12 may comprise a second proximal segment end 13 and a second distal segment end 14. The second proximal segment end 13 is the portion of the second horizontal rail segment 12 that is generally proximal to the second vertical rail 16. The second distal segment end 14 is the portion of the second horizontal rail segment 12 that is generally distal from the second vertical rail 16. The first proximal segment end 10 may be connected to the first vertical rail 15. This arrangement results in appropriate positioning of the first distal segment end 11 relative to the second distal segment end 14. The second proximal segment end 13 may be connected to the second vertical rail 16. This arrangement results in appropriate positioning of the second distal segment end 14 relative to the first distal segment end 11. The first distal segment end 11 may be slidably engaged to the second distal segment end 14. In this way, the first distal end and the second distal end may form an unbendable unit that prevents people and objects from passing between the first vertical rail 15 and the second vertical rail 16. The first distal segment end 11 may be attached to the second distal segment end 14 by the horizontal length adjustment mechanism 20. Thus, the horizontal length adjustment mechanism 20 is positioned appropriately to interact with both the first distal segment end 11 and the second distal segment end 14.

Figure 3:
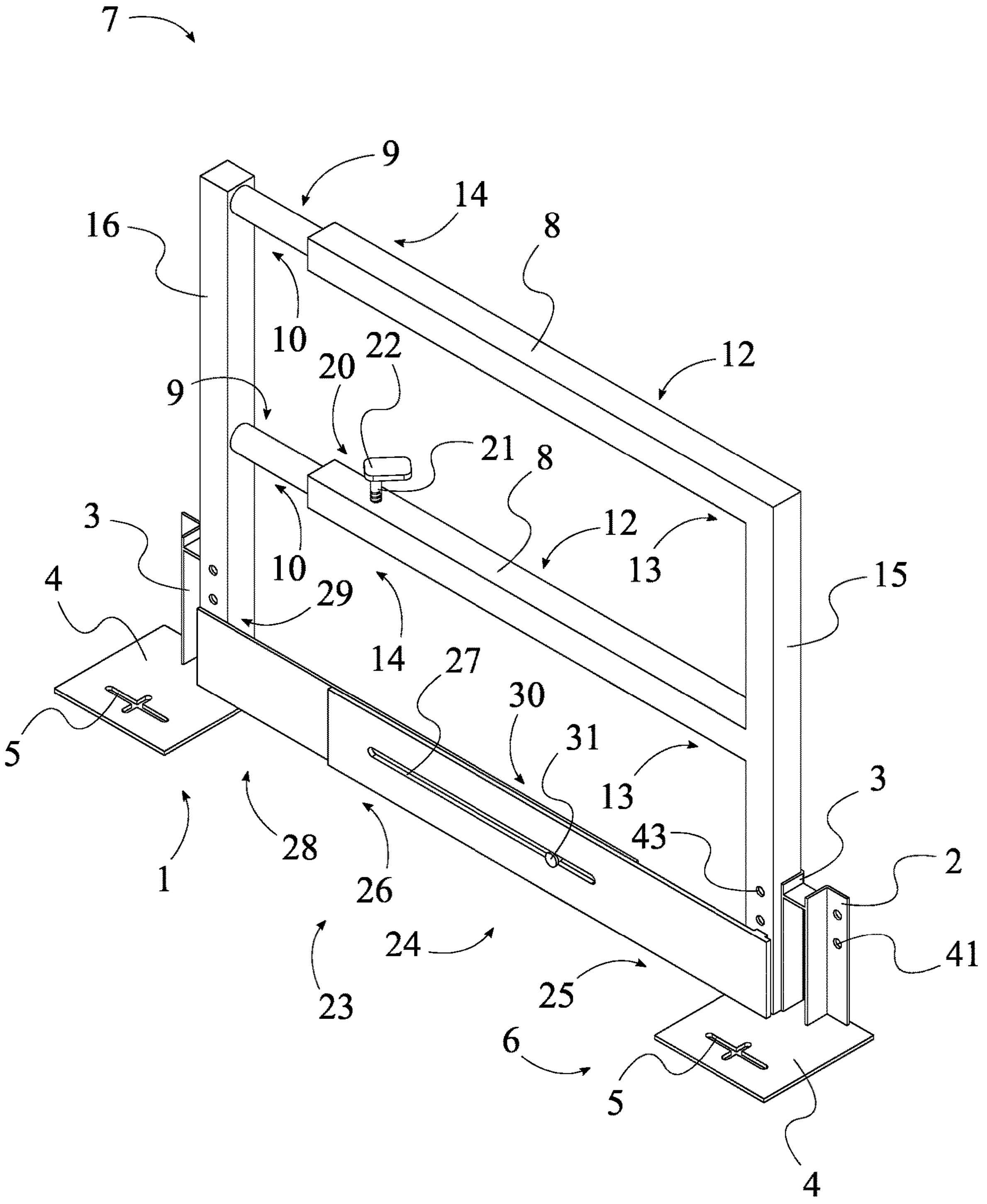
FIG. 3 is a rear perspective view of the present invention with adjustable horizontal length.

The horizontal length adjustment mechanism 20 must be both intuitive and effective at securing and releasing the position of the first distal segment end 11 relative to the second distal segment end 14. To provide for this, the horizontal length adjustment mechanism 20 may comprise a tightening fastener 21 and a tightening handle 22, as shown in FIG. 3. The tightening fastener 21 relates to a unit capable of tightening to secure the first distal segment end 11 in position relative to the second distal segment end 14. The tightening handle 22 is the portion of the tightening fastener 21 which may be grasped, pushed, or pulled by a user in order to actuate the tightening fastener 21. The tightening fastener 21 may be connected around the first horizontal segment end. This arrangement allows the tightening fastener 21 to affect the connection of the first horizontal segment end to the second horizontal end. The tightening handle 22 may be threadably connected to the tightening fastener 21. In this way, the tightening handle 22 may be rotated to shift the tightening fastener 21 closer to or further from the second horizontal end. The tightening fastener 21 may be pressed against the second horizontal segment end. The tightening fastener 21 may pass through the first horizontal segment end in order to shift into position relative to the second horizontal segment end.

The present invention may benefit from the addition of a horizontally-oriented unit capable of preventing people or objects from falling or sliding beneath the at least one guardrail assembly 7. To this end, the present invention may further comprise a horizontal toeplate 23, as shown in FIG. 3. The horizontal toeplate 23 is a generally flat panel that can prevent items from passing through a vertical section of the at least one guardrail assembly 7. The horizontal toeplate 23 may comprise a first toeplate segment 24 and a second toeplate segment 28. The first toeplate segment 24 is the portion of the horizontal toeplate 23 opposite the second toeplate segment 28 that is used to position the horizontal toeplate 23 relative to the first vertical rail 15. The second toeplate segment 28 is the portion of the horizontal toeplate 23 opposite the first toeplate segment 24 that is used to position the horizontal toeplate 23 relative to the second vertical rail 16. The first toeplate segment 24 may comprise a first proximal toeplate end 25, a first distal toeplate end 26, and a slotted track 27. The first proximal toeplate end 25 is the portion of the first toeplate segment 24 that is generally proximal to the first vertical rail 15. The first distal toeplate end 26 is the portion of the first toeplate segment 24 that is generally distal from the first vertical rail 15. The slotted track 27 is a slot-shaped cut into the first toeplate segment 24 that may serve as a guiding mechanism for the second toeplate segment 28. The second toeplate segment 28 may comprise a second proximal toeplate end 29, a second distal toeplate end 30, and a track guide 31. The second proximal toeplate end 29 is the portion of the second toeplate segment 28 that is generally proximal to the second vertical rail 16. The second distal toeplate end 30 is the portion of the second toeplate segment 28 that is generally distal from the second vertical rail 16. The track guide 31 is a protrusion which may slide along the track guide 31 to enable appropriate connection and motion of the first toeplate segment 24 relative to the second toeplate segment 28 during adjustment of the length of the horizontal toeplate 23. The horizontal toeplate 23 may be perpendicularly attached between the first vertical rail 15 and the second vertical rail 16. This arrangement allows the horizontal toeplate 23 to contribute to the barricade formed by the at least one horizontal rail 8. The first proximal toeplate end 25 may be connected onto the first vertical rail 15. This arrangement ensures that the first proximal toeplate cannot move relative to the first vertical rail 15, thus providing enhanced stability for the first proximal toeplate. Similarly, the second proximal toeplate end 29 may be connected onto the second vertical rail 16. This arrangement ensures that the second proximal toeplate cannot move relative to the second vertical rail 16, thereby providing enhanced stability for the second proximal toeplate. The slotted track 27 may traverse through the first toeplate segment 24, adjacent to the first distal toeplate end 26. In this way, the slotted track 27 is positioned generally adjacent to the second distal toeplate end 30, which facilitates interaction between the slotted track 27 and the track guide 31. The track guide 31 may be connected to the second toeplate segment 28. This arrangement allows the position of the track guide 31 to affect the position of the second toeplate segment 28. The track guide 31 may extend perpendicular to the second toeplate segment 28, adjacent to the second distal toeplate end 30. Thus, the track guide 31 is positioned generally proximal to the second distal toeplate end 30, thereby facilitating interaction between the slotted track 27 and the track guide 31. The track guide 31 may be slidably engaged to the slotted track 27. This arrangement allows the first toeplate segment 24 to slide relative to the second toeplate segment 28, thus allowing for adjustment of the width of the horizontal toeplate 23 without risking physical separation of the first toeplate segment 24 from the second toeplate segment 28.

Figure 6:
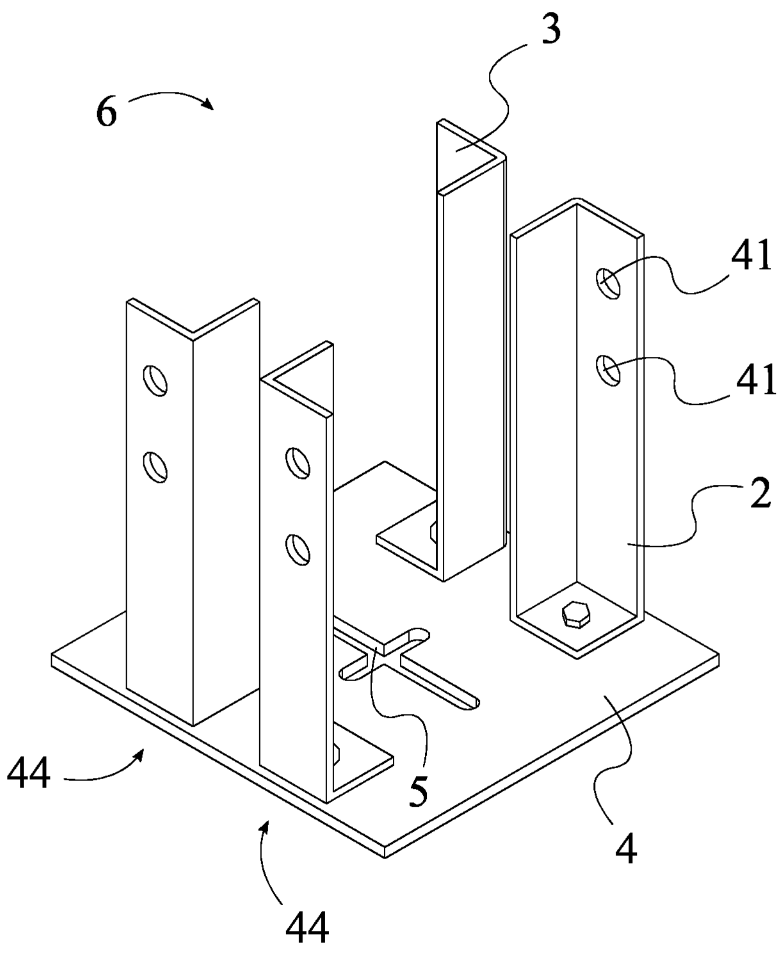
FIG. 6 is a front perspective view of an embodiment of a structural base.

In order to provide the most flexibility in potential arrangements of adjacent guardrail assemblies of the at least one guardrail assembly 7, the first vertical bracket 2 and the second vertical bracket 3 of the corresponding structural bases of the at least one first structural base 1 and the at least one second structural base 6 may benefit from options that allow for some angular adjustment of connected guardrail assemblies of the at least one guardrail assembly 7. To provide for this, the first vertical bracket 2 and the second vertical bracket 3 may be pivotably mounted onto the base plate 4, as shown in FIG. 6. This arrangement allows the connected first vertical rail 15 and second vertical rail 16 to rotate, thereby providing enhanced options for angles between adjacent guardrail assemblies of the at least one guardrail assembly 7.

Figure 5:
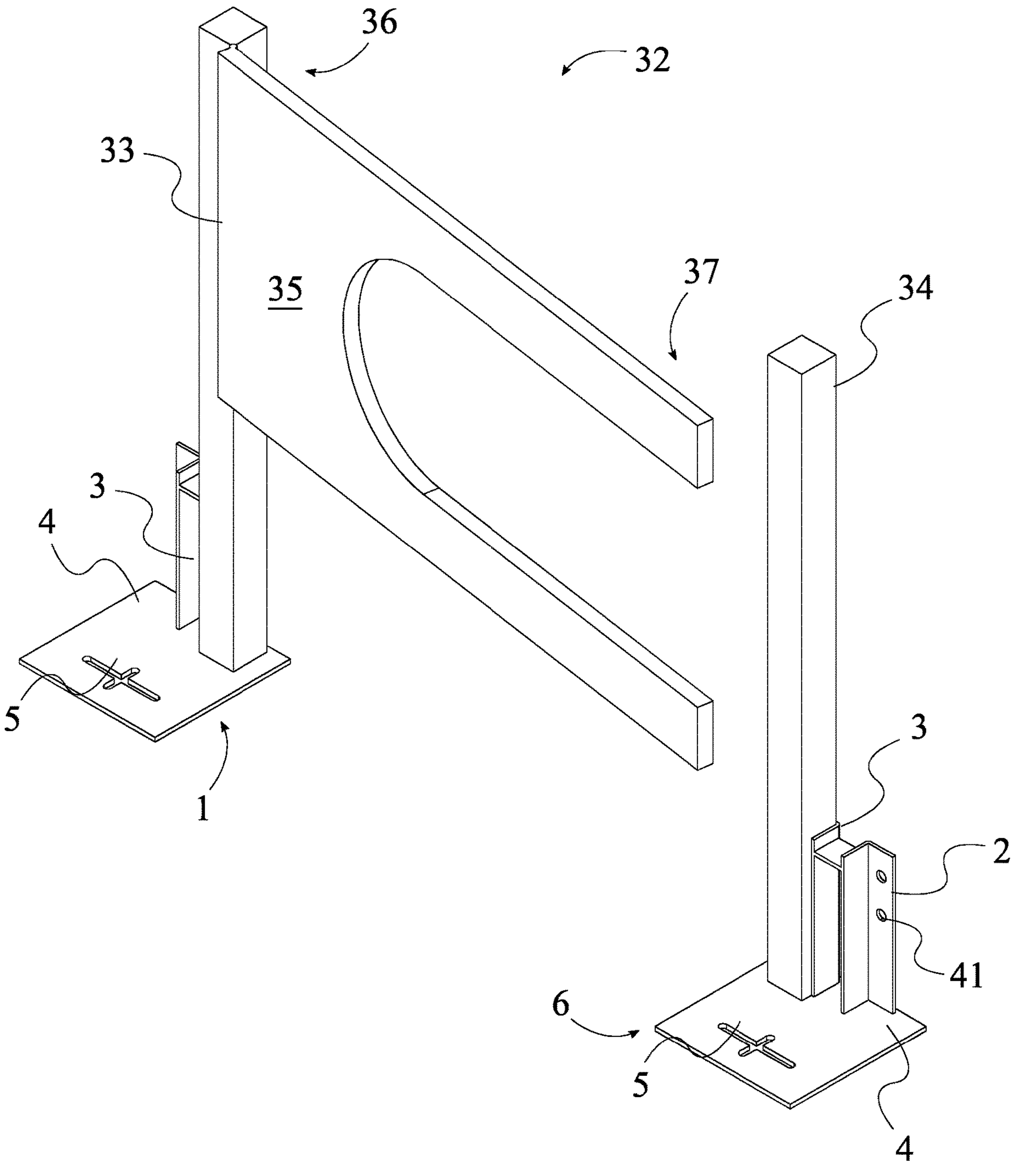
FIG. 5 is a front perspective view of a gate of the present invention.

A user of the present invention may wish to deliberately pass through the at least one guardrail assembly 7 without disassembling the present invention. To provide for this, the present invention may further comprise a guardrail gate 32, as shown in FIG. 5. The guardrail gate 32 is a modular unit capable of joining between guardrail assemblies of the at least one guardrail assembly 7 and swinging open or closed to allow for the passage of users. The guardrail gate 32 may comprise a vertical gate post 33, a gate stopper 34, and a gate panel 35. The vertical gate post 33 is the elongated unit capable of positioning the gate panel 35 appropriately in relation to the at least one first structural base 1. The gate stopper 34 is a post or other rigid unit capable of preventing the gate panel 35 from swinging freely, or beyond a desired range of motion. The gate stopper 34 also provides strength against any downward force exerted upon the gate panel 35 when the gate panel 35 is closed. The gate panel 35 is a generally flat unit that may prevent objects from passing unintentionally while simultaneously providing an intuitive grasping mechanism, allowing the user to operate the guardrail gate 32. The gate panel 35 may comprise a proximal gate end 36 and a distal gate end 37. The proximal gate end 36 relates to the portion of the gate panel 35 that is generally proximal to the vertical gate post 33. The distal gate end 37 is the portion of the gate panel 35 that is generally distal from the vertical gate post 33. The vertical gate post 33 may be fastened to the first vertical bracket 2 of the at least one first structural base 1. This arrangement secures the vertical gate post 33 in position relative to the first vertical bracket 2. The gate stopper 34 may be fastened to the second vertical bracket 3 of the at least one second structural base 6. In this way, the gate panel 35 may swing into the gate stopper 34, thus defining the available range of motion of the gate panel 35. The proximal gate end 36 may be hingedly connected to the vertical gate post 33. This arrangement allows for appropriate hinging motion of the distal gate end 37 during use, ensuring that the gate panel 35 can swing relative to the vertical gate post 33. The distal gate end 37 may be positioned adjacent to the gate stopper 34. Thus, the distal gate end 37 may form a continuous blockade between the vertical gate post 33 and the gate stopper 34. In an exemplary embodiment, the distal gate end 37 may be removably fastened to the gate stopper 34 in a locked configuration and rotated away from the gate stopper 34 in an opened configuration.

The present invention may benefit from the ability to secure or fasten the first vertical rail 15 to the first vertical bracket 2 of the at least one first structural base 1 and the second vertical rail 16 to the second vertical bracket 3 of the at least one second structural base 6. To this end, the present invention may further comprise at least one first base pin 38, at least one second base pin 39, at least one first bracket opening 40, at least one second bracket opening 41, at least one first rail opening 42, and at least one second rail opening 43, as shown in FIG. 1. The at least one first base pin 38 is a rigid, generally elongated unit capable of securing the first vertical bracket 2 to the first vertical rail 15. Similarly, the at least one second base pin 39 is a rigid, generally elongated unit capable of securing the second vertical bracket 3 to the second vertical rail 16. The at least one first bracket opening 40 is a hole or row of holes which may serve as a mechanism for securing items, especially the first vertical rail 15, to the first vertical bracket 2. The at least one second bracket opening 41 is a hole or row of holes which may serve as a mechanism for securing items, especially the second vertical rail 16, to the second vertical bracket 3. The at least one first rail opening 42 is a hole or row of holes which may serve as a mechanism for securing items, especially the first vertical bracket 2, to the first vertical rail 15. The at least one second rail opening 43 is a hole or row of holes which may serve as a mechanism for securing items, especially the second vertical bracket 3, to the second vertical rail 16. The at least one first bracket opening 40 may traverse through the first vertical bracket 2 of the at least one first structural base 1. This arrangement enables objects to secure to the first vertical bracket 2. Similarly, the at least one second bracket opening 41 may traverse through the second vertical bracket 3 of the at least one second structural base 6. This arrangement enables objects to secure to the second vertical bracket 3. The at least one first rail opening 42 may traverse through the first vertical rail 15. In this way, items may connect to the first vertical rail 15. Similarly, the at least one second rail opening 43 may traverse through the second vertical rail 16. In this way, items may connect to the second vertical rail 16. The at least one first rail opening 42 may be concentrically aligned with the at least one first bracket opening 40. Thus, a connector may be thread through both the at least one first rail opening 42 and the at least one first bracket opening 40 to join the first vertical rail 15 to the first vertical bracket 2. Similarly, the at least one second rail opening 43 may be concentrically aligned with the at least one second bracket opening 41. Thus, a connector may be thread through both the at least one second rail opening 43 and the at least one second bracket opening 41 to join the second vertical rail 16 to the second vertical bracket 3. The at least one first base pin 38 may be positioned through the at least one first rail opening 42 and the at least one first bracket opening 40. This arrangement secures the first vertical rail 15 to the first vertical bracket 2. The at least one second base pin 39 may be positioned through the at least one second rail opening 43 and the at least one second bracket opening 41. This arrangement secures the second vertical rail 16 to the second vertical bracket 3.

The user may wish to assemble the present invention such that intersections of three or more guardrail assemblies of the at least one guardrail assembly 7 are possible. To allow for this, the present invention may further comprise at least one ancillary vertical bracket 44, as shown in FIG. 6. The at least one ancillary vertical bracket 44 is a rigid connector that allows the at least one guardrail assembly 7 to join to the base plate 4. The at least one ancillary vertical bracket 44 may be terminally attached perpendicular to the base plate 4. Thus, the first vertical rail 15 or the second vertical rail 16 may mount onto the at least one ancillary vertical bracket 44 to form a barrier intersection.

Although the invention has been explained in relation to its preferred embodiment, it is to be understood that many other possible modifications and variations can be made without departing from the spirit and scope of the invention as hereinafter claimed.

What is claimed is:

1. A modular guardrail system comprising:

at least one first structural base;

at least one second structural base;

at least one guardrail assembly;

the at least one first structural base and the at least one second structural base comprising a first vertical bracket, a second vertical bracket, a base plate, and an anchoring opening, wherein the anchoring opening is a t-shaped hole;

the at least one guardrail assembly comprising at least one horizontal rail, a first vertical rail, and a second vertical rail;

the at least one horizontal rail comprising a first horizontal rail segment and a second horizontal rail segment;

the first vertical bracket and the second vertical bracket being terminally attached perpendicular to the base plate;

the anchoring opening traversing through the base plate, adjacent to the first vertical bracket and the second vertical bracket;

the first vertical rail being fastened to the first vertical bracket of the at least one first structural base;

the second vertical rail being fastened to the second vertical bracket of the at least one second structural base;

the first vertical rail being positioned offset from the second vertical rail;

the at least one horizontal rail being perpendicularly connected between the first vertical rail and the second vertical rail;

the first horizontal rail segment being terminally connected to the first vertical rail; and the second horizontal rail segment being terminally connected to the second vertical rail.

2. The modular guardrail system as claimed in claim 1 comprising:

an anchoring fastener;

the anchoring fastener comprising an anchoring stopper and an anchoring pin;

the anchoring stopper being terminally connected to the anchoring pin;

the anchoring fastener being positioned against the base plate; and the anchoring pin traversing through the anchoring opening.

3. The modular guardrail system as claimed in claim 1 comprising:

a horizontal length adjustment mechanism;

the first horizontal rail segment comprising a first proximal segment end and a first distal segment end;

the second horizontal rail segment comprising a second proximal segment end and a second distal segment end;

the first proximal segment end being connected to the first vertical rail;

the second proximal segment end being connected to the second vertical rail;

the first distal segment end being slidably engaged to the second distal segment end; and the first distal segment end being attached to the second distal segment end by the horizontal length adjustment mechanism.

4. The modular guardrail system as claimed in claim 3 comprising:

the horizontal length adjustment mechanism comprising a tightening fastener and a tightening handle;

the tightening fastener being connected around the first distal segment end;

the tightening handle being threadably connected to the tightening fastener; and the tightening fastener being pressed against the second distal segment end.

5. The modular guardrail system as claimed in claim 1 comprising:

a horizontal toeplate;

the horizontal toeplate comprising a first toeplate segment and a second toeplate segment;

the first toeplate segment comprising a first proximal toeplate end, a first distal toeplate end, and a slotted track;

the second toeplate segment comprising a second proximal toeplate end, a second distal toeplate end, and a track guide;

the horizontal toeplate being perpendicularly attached between the first vertical rail and the second vertical rail;

the first proximal toeplate end being connected onto the first vertical rail;

the second proximal toeplate end being connected onto the second vertical rail;

the slotted track traversing through the first toeplate segment, adjacent to the first distal toeplate end;

the track guide being connected to the second toeplate segment;

the track guide extending perpendicular to the second toeplate segment, adjacent to the second distal toeplate end; and the track guide being slidably engaged to the slotted track.

6. The modular guardrail system as claimed in claim 1, wherein the first vertical bracket and the second vertical bracket are pivotably mounted onto the base plate.

7. The modular guardrail system as claimed in claim 1 comprising:

a guardrail gate;

the guardrail gate comprising a vertical gate post, a gate stopper, and a gate panel;

the gate panel comprising a proximal gate end and a distal gate end;

the vertical gate post being fastened to the first vertical bracket of the at least one first structural base;

the gate stopper being fastened to the second vertical bracket of the at least one second structural base;

the proximal gate end being hingedly connected to the vertical gate post; and the distal gate end being positioned adjacent to the gate stopper.

8. The modular guardrail system as claimed in claim 1 comprising:

at least one first base pin;

at least one second base pin;

at least one first bracket opening;

at least one second bracket opening;

at least one first rail opening;

at least one second rail opening;

the at least one first bracket opening traversing through the first vertical bracket of the at least one first structural base;

the at least one second bracket opening traversing through the second vertical bracket of the at least one second structural base;

the at least one first rail opening traversing through the first vertical rail;

the at least one second rail opening traversing through the second vertical rail;

the at least one first rail opening being concentrically aligned with the at least one first bracket opening;

the at least one second rail opening being concentrically aligned with the at least one second bracket opening;

the at least one first base pin being positioned through the at least one first rail opening and the at least one first bracket opening; and
the at least one second base pin being positioned through the at least one second rail opening and the at least one second bracket opening.

9. The modular guardrail system as claimed in claim 1 comprising:
at least one ancillary vertical bracket; and
the at least one ancillary vertical bracket being terminally attached perpendicular to the base plate.

10. A modular guardrail system comprising:
at least one first structural base;
at least one second structural base;
at least one guardrail assembly;
a horizontal toeplate;
the at least one first structural base and the at least one second structural base comprising a first vertical bracket, a second vertical bracket, a base plate, and an anchoring opening, wherein the anchoring opening is a t-shaped hole;
the at least one guardrail assembly comprising at least one horizontal rail, a first vertical rail, and a second vertical rail;
the at least one horizontal rail comprising a first horizontal rail segment and a second horizontal rail segment;
the horizontal toeplate comprising a first toeplate segment and a second toeplate segment;
the first toeplate segment comprising a first proximal toeplate end, a first distal toeplate end, and a slotted track;
the second toeplate segment comprising a second proximal toeplate end, a second distal toeplate end, and a track guide;
the first vertical bracket and the second vertical bracket being terminally attached perpendicular to the base plate;
the anchoring opening traversing through the base plate, adjacent to the first vertical bracket and the second vertical bracket;
the first vertical rail being fastened to the first vertical bracket of the at least one first structural base;
the second vertical rail being fastened to the second vertical bracket of the at least one second structural base;
the first vertical rail being positioned offset from the second vertical rail;
the at least one horizontal rail being perpendicularly connected between the first vertical rail and the second vertical rail;
the first horizontal rail segment being terminally connected to the first vertical rail;
the second horizontal rail segment being terminally connected to the second vertical rail;
the horizontal toeplate being perpendicularly attached between the first vertical rail and the second vertical rail;
the first proximal toeplate end being connected onto the first vertical rail;
the second proximal toeplate end being connected onto the second vertical rail;
the slotted track traversing through the first toeplate segment, adjacent to the first distal toeplate end;
the track guide being connected to the second toeplate segment;
the track guide extending perpendicular to the second toeplate segment, adjacent to the second distal toeplate end; and
the track guide being slidably engaged to the slotted track.

11. The modular guardrail system as claimed in claim 10 comprising:
an anchoring fastener;
the anchoring fastener comprising an anchoring stopper and an anchoring pin;
the anchoring stopper being terminally connected to the anchoring pin;
the anchoring fastener being positioned against the base plate; and
the anchoring pin traversing through the anchoring opening.

12. The modular guardrail system as claimed in claim 10 comprising:
a horizontal length adjustment mechanism;
the first horizontal rail segment comprising a first proximal segment end and a first distal segment end;
the second horizontal rail segment comprising a second proximal segment end and a second distal segment end;
the first proximal segment end being connected to the first vertical rail;
the second proximal segment end being connected to the second vertical rail;
the first distal segment end being slidably engaged to the second distal segment end; and
the first distal segment end being attached to the second distal segment end by the horizontal length adjustment mechanism.

13. The modular guardrail system as claimed in claim 12 comprising:
the horizontal length adjustment mechanism comprising a tightening fastener and a tightening handle;
the tightening fastener being connected around the first distal segment end;
the tightening handle being threadably connected to the tightening fastener; and
the tightening fastener being pressed against the second distal segment end.

14. The modular guardrail system as claimed in claim 10, wherein the first vertical bracket and the second vertical bracket are pivotably mounted onto the base plate.

15. The modular guardrail system as claimed in claim 10 comprising:
a guardrail gate;
the guardrail gate comprising a vertical gate post, a gate stopper, and a gate panel;
the gate panel comprising a proximal gate end and a distal gate end;
the vertical gate post being fastened to the first vertical bracket of the at least one first structural base;
the gate stopper being fastened to the second vertical bracket of the at least one second structural base;
the proximal gate end being hingedly connected to the vertical gate post; and
the distal gate end being positioned adjacent to the gate stopper.

16. The modular guardrail system as claimed in claim 10 comprising:
at least one first base pin;
at least one second base pin;
at least one first bracket opening;
at least one second bracket opening;
at least one first rail opening;
at least one second rail opening;

the at least one first bracket opening traversing through the first vertical bracket of the at least one first structural base;

the at least one second bracket opening traversing through the second vertical bracket of the at least one second structural base;

the at least one first rail opening traversing through the first vertical rail;

the at least one second rail opening traversing through the second vertical rail;

the at least one first rail opening being concentrically aligned with the at least one first bracket opening;

the at least one second rail opening being concentrically aligned with the at least one second bracket opening;

the at least one first base pin being positioned through the at least one first rail opening and the at least one first bracket opening; and the at least one second base pin being positioned through the at least one second rail opening and the at least one second bracket opening.

17. The modular guardrail system as claimed in claim 10 comprising:

at least one ancillary vertical bracket; and the at least one ancillary vertical bracket being terminally attached perpendicular to the base plate.

* * * * *